US008666948B1

United States Patent
Kearns et al.

(10) Patent No.: US 8,666,948 B1
(45) Date of Patent: Mar. 4, 2014

(54) AUTOMATICALLY GENERATING A CUSTOMER NOTIFICATION FILE STATUS REPORT

(75) Inventors: James E. Kearns, Lincoln Park, NJ (US); Venkat Gaddam, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 823 days.

(21) Appl. No.: 12/512,472

(22) Filed: Jul. 30, 2009

(51) Int. Cl.
*G06F 7/00* (2006.01)

(52) U.S. Cl.
USPC .......................................... 707/691

(58) Field of Classification Search
USPC ........................ 707/691, 781, 750, 999.101
See application file for complete search history.

(56) References Cited

U.S. PATENT DOCUMENTS

| 2002/0095454 | A1* | 7/2002 | Reed et al. | 709/201 |
| 2007/0073808 | A1* | 3/2007 | Berrey et al. | 709/204 |
| 2009/0037520 | A1* | 2/2009 | Loffredo | 709/203 |
| 2009/0106277 | A1* | 4/2009 | Sidman | 707/100 |
| 2009/0233623 | A1* | 9/2009 | Johnson | 455/456.3 |
| 2010/0064001 | A1* | 3/2010 | Daily | 709/203 |

* cited by examiner

*Primary Examiner* — Mohammed R Uddin

(57) ABSTRACT

A customer communication system of a mobile communication network automatically generates a report concerning the location of a customer notification file within the customer communication system to allow for easier file review in response to an error message. In the examples, a file information database is accessed to obtain information regarding the expected file name or expected location of the customer notification file. Using the file information, a search is conducted for the location of the customer notification file. Error correction information is also collected regarding the customer notification file. The system then generates a report combining the information regarding the location of the customer notification file with the reference information regarding any error correction instructions. The report is published, thereby allowing any user responsible for the correction of an error message to access the file location information and the associated error correction instructions.

19 Claims, 5 Drawing Sheets

AUTOMATICALLY GENERATING A CUSTOMER NOTIFICATION FILE STATUS REPORT

TECHNICAL FIELD

The present subject matter relates to techniques and equipment associated with wireless communications systems. In more detail, the present disclosure relates to customer notification file monitoring and the generation of a report related to the location of customer notification files.

BACKGROUND

In recent years, mobile wireless communications have become increasingly popular. Initial implementations of mobile wireless communications, for example in the form of cellular telephone networks, supported circuit switched voice communication services. The carriers developed short message service (SMS) technology to provide text and/or email communications via the wireless communication networks. As the public wireless communication networks have evolved to provide greater bandwidth and packet based services, the industry has developed a variety of data services, such as web browsing, as well as a variety of services using multimedia message service (MMS) technology.

There have been many situations in which notifications were provided to account holders. To ensure effective communication of such notifications, Verizon Wireless implemented a delivery approach which utilized one or more electronic delivery methods as the first attempts. Verizon Wireless also implemented an internal notification file review system to ensure files containing customer critical notifications were not corrupted or missing from the Verizon Wireless computer network. The Verizon Wireless files resulting in customer notifications are transferred within the Verizon Wireless computer network using a system called Network Data Mover (NDM). Using the NDM, files are transferred to a group of servers from which the customer notifications are processed. When a file transfer via the NDM is unsuccessful or faulty, an error message is generated and sent to the Customer Communication Enterprise Services (CCES) department for investigation of the error. For example, when a "bill is ready to view" notification is triggered, a notification file is generated which will result in a notification being sent to the customer using the communication method chosen by the customer. The notification file may be stored with other similar customer notification files on the CCES servers until a batch or grouping of the files can be processed together. Other example notifications include an alert that an automatic payment has been received or a the expiration date on a credit card on file has expired.

The error message described above may be generated in two situations. First, when a notification file is created, a data check is performed to confirm the quality of the file creation. If the file was created, and the record count or file size is zero, an error message may be generated. Second, an error message may be generated when the system searches for a notification file in preparation for sending a customer message and determines the file is either corrupt or missing. Due to the "flag" or alert, the customer communication transaction will not take place without intervention from the CCES department. However, in previous error notification systems or techniques, the content of the error message would be scant and offer very little detailed information. This limited information would require the CCES department to manually check on the status of multiple file's arrival or content validity.

Hence a need exists for the design and implementation of an automated centralized reporting system that can provide the CCES department with an updated file report across all subject servers regarding the location of customer notification files within the customer communication system. A complete report would allow the CCES department to investigate and remedy errors much faster and would result in a more efficient client notification process.

SUMMARY

The teachings herein improve over the art by providing an automated file status reporting system, for example, to provide a CCES department agent or other user with a real time report on the location and status of a transferred customer notification file within the CCES department servers.

For example, a disclosed methodology generates a report concerning the location of a data file within the customer communication department. This methodology entails accessing a file information database to obtain the directory location or a file name of an expected file following a file transfer. The information obtained from the file information database is then used to search servers for the presence of the expected file. The results of the search for the expected file are compiled. An error correction database is also accessed to obtain information regarding the expected file, specifically, any error correction reference information that would be needed to correct a possible error with the expected file. Finally, a report containing the compiled information relating to the expected file and the error correction reference information is generated and a user is allowed access to the generated report.

The user may be sent an alert, thereby prompting the user to review the report. In one example, the alert may be sent to the user via email and the user may review the report using the Internet or similarly, a web browser connected to the Internet. In other examples, the file information database may be modifiable such that new or updated expected file types, that would require searching, may be added to the file information database. Also, the report may include additional information such as the expected file name, error correction instructions, the server name, the file directory, information about the file content or records regarding the transfer of the expected file. Finally, the methodology described may be controlled by a master scheduler that automatically initiates the generation of the report after the expiration of a set time frame. For example, the report could be re-generated every hour so that the published report is regularly updated.

The disclosure also encompasses examples of systems for generating a report concerning the location of a data file within the customer communication department.

For example, a disclosed mobile communication system includes a traffic network for providing mobile communications services to mobile stations of subscribers, network servers in communication with the traffic network for storing files of recorded information regarding mobile stations and network subscribers, and mobile communications network elements in communication with the servers. The mobile communication network elements access a file information database to obtain either the directory location or a file name of an expected file following a file transfer. The information obtained from the file information database is then used to search servers for the presence of the expected file. The results of the search for the expected file are then compiled and stored. An error correction database is also accessed by the mobile communication network elements to obtain error correction reference information regarding the expected file, specifically, any information that would be needed to correct a possible error with the expected file is obtained. Finally, a report containing the compiled information relating to the expected file and the error correction reference information is generated and a user is allowed access to the generated report.

The file information database of the mobile communications system is also modifiable such that new or updated expected file types, that would require searching, may be added to the file information database.

Other disclosed concepts relate to unique software for implementing techniques for generating a report concerning the location of a data file within the customer communication department, similar to the methodology discussed above. A software product, in accord with this concept, includes at least one machine-readable medium and executable program instructions embodied in or carried by the medium. Execution of the program instruction by a programmable system coupled to a mobile communication network causes the system to perform the functions for generating the relevant report concerning the locations of the data file within the customer communication department.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The various examples disclosed herein relate to technologies for confirming the transmission of notifications to a mobile service subscriber, particularly in the event of one of a number of specific types of changes to the subscriber's account with a mobile network service provider or carrier. For example, when a customer's bill is ready to view, an automatic payment has been received from the customer or the expiration date associated with a customer's credit card has expired, an internal data file is generated. The internal file is transferred from one computer or system to a computer or system within the Customer Communication Enterprise Solutions (CCES) system, prompting the CCES system to send a notification to the customer.

The exemplary implementation works with various other carrier systems that may detect a need for subscriber notification, such as a web site access to change a subscription account or notifications regarding billing. The exemplary implementation, however, provides the various functions in support of the notification service from one or more systems specifically configured to generate and send the notification. As a result, the notification service system(s) can be easily scaled to meet increased demands for providing a variety of notifications to a large number of mobile subscribers/users, yet allow the carrier's other systems to continue to efficiently handle their normal operations.

These techniques and equipment described by way of example herein allow information to be effectively communicated to the customer and allow the any problems to be easily addressed when an error arises in the processing of the customer notification.

Figure 1:
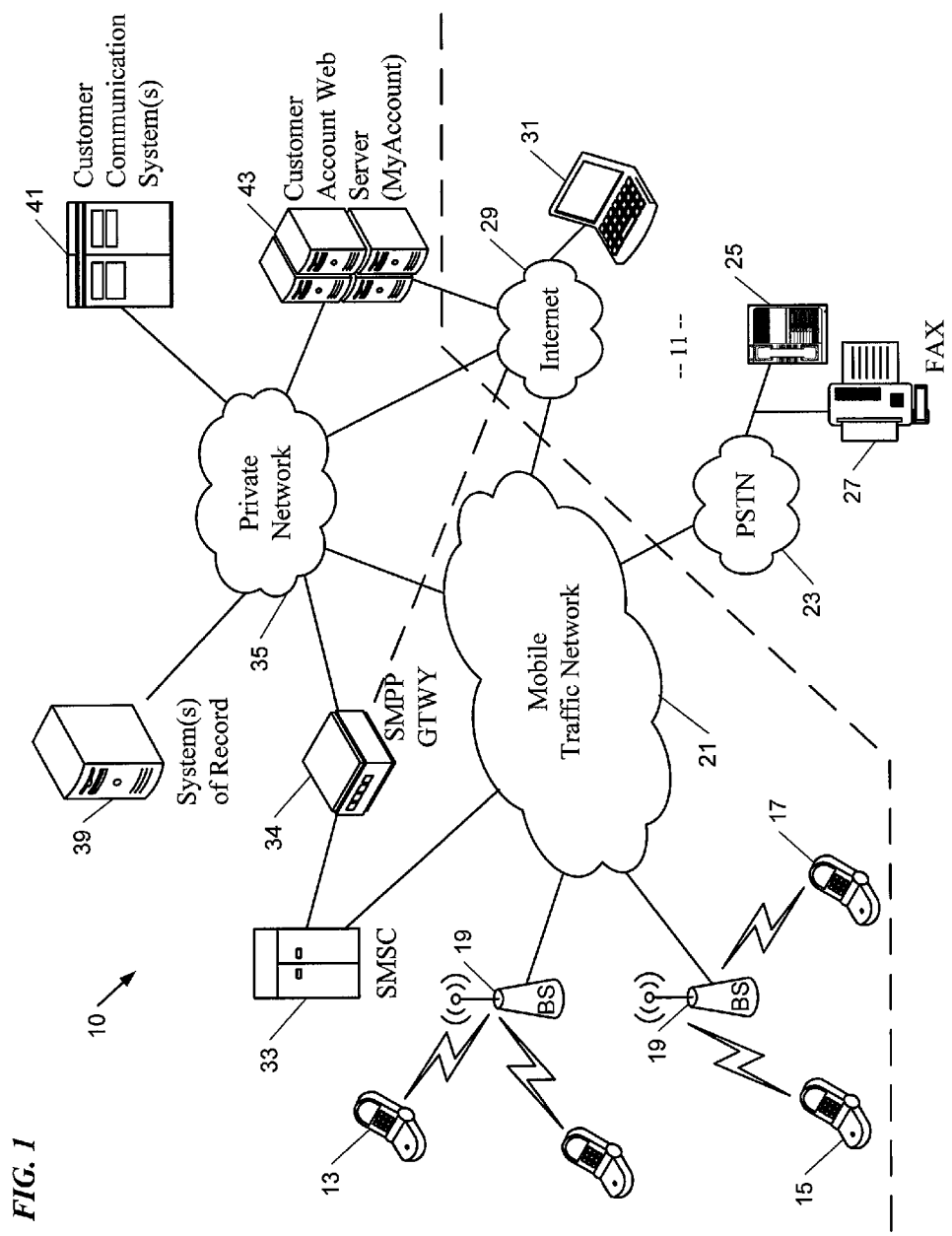
FIG. 1 is a functional block diagram useful in understanding networked elements/systems that may be used in providing mobile service subscribers various notifications, upon occurrence of certain types of changes in the subscribers' accounts.

Reference now is made in detail to the examples illustrated in the accompanying drawings and discussed below. FIG. 1 illustrates a number of mobile stations, a mobile communication network coupled to other communication networks and several systems/elements associated with or included in the mobile network for various functions as may be involved in managing subscriber accounts, allowing subscribers to change at least some account information and provide subscriber notifications.

FIG. 1 illustrates a mobile communication network 10 as may be operated by a carrier or service provider to provide a wide range of mobile communication services and ancillary services or features to its subscriber customers and associated mobile station (MS) users. The elements generally indicated by the reference numeral 10 are elements of the network and are operated by or on behalf of the carrier, although the mobile stations typically are sold to the carrier's customers. The mobile communication network 10 provides communications between mobile stations as well as communications for the mobile stations with networks and stations 11 outside the mobile communication network 10.

For purposes of later discussion, several mobile stations appear in the drawing, to represent examples of the mobile stations that may receive various services via the mobile communication network 10. Today, mobile stations typically take the form portable handsets, smart-phones or personal digital assistants, although they may be implemented in other form factors. For discussion of some of the notification scenarios, we will assume that the mobile stations 13, 15 and 17 and their associated MDNs are all covered under one subscriber account, and that among those stations, the mobile station 13 is the station of the account holder (AH).

The network 10 allows users of the mobile stations to initiate and receive telephone calls to each other as well as through the public switched telephone network (PSTN) and telephone stations connected thereto. The network 10 allows SMS type text messaging between mobile stations and similar messaging with other devices via the Internet. The network 10 typically offers a variety of other data services via the Internet, such as downloads, web browsing, email, etc.

The mobile communication network 10 typically is implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13, 15 and 17, will typically include one or more RANs and a regional circuit and/or packet switched network and associated signaling network facilities.

Physical elements of a RAN operated by one of the mobile service providers or carriers include a number of base stations represented in the example by the base stations (BSs) 19. Although not separately shown, such a base station 19 typically comprises a base transceiver system (BTS) which communicates via an antennae system at the site of base station and over the airlink with one or more of the mobile stations 13, 15 and 17, when the mobile stations are within range. Each base station typically includes a BTS coupled to several antennae mounted on a radio tower within a coverage area often referred to as a "cell." The BTS is the part of the radio network that sends and receives RF signals to/from the mobile stations that the base station currently serves.

The radio access networks also include a traffic network represented generally by the cloud at 21, which carries the user communications for the mobile stations 13, 15 and 17 between the base stations and other elements with or through which the mobile stations communicate. Individual elements such as switches and/or routers forming the traffic network 21 are omitted here form simplicity.

A Mobile Directory Number (MDN) or Mobile Telephone Number (MTN) is the telephone number assigned to a mobile station, which a calling party or device inputs in order to call or send a message to the particular mobile station. To call the mobile station 15, for example, a user of a PSTN telephone or of another mobile station dials the MDN associated with the mobile station 15. To send a MMS message or a SMS message to destination mobile station 15, as another example, typically entails input of the MDN of that mobile station. A Mobile Identification Number (MIN) is an identification number used by the network 10 to signal a particular mobile station. The MIN is formatted like a telephone number, and the MIN may be the same as the MDN. However, increasingly, the network assigns a different number for use as the MIN and translates the MDN input by a calling or other originating party into the MIN that the network 10 uses to establish the call or send the message to the destination mobile station. Of these numbers assigned to the mobile station, the MDN typically is the number or address of the station known and used by other parties or stations.

The traffic network portion 21 of the mobile communication network 10 connects to a public switched telephone network 23. This allows the network 10 to provide voice grade call connections between mobile stations and regular telephones connected to the PSTN 23. The drawing shows one such telephone at 25. For purposes of discussing notifications, some notifications may entail voice message delivery or even service representative calls to the account holder, for example, at a regular telephone such as telephone 25 via the PSTN 23. The PSTN 23 also provides connections to other types of customer premises equipment, such as facsimile or 'FAX' machines. The drawing shows one FAX machine 27, by way of example, to illustrate the point that a subscriber or account holder notification may entail a facsimile transmission of the notification message to the subscriber's FAX machine, such as the machine 27.

The traffic network portion 21 of the mobile communication network 10 connects to a public packet switched data communication network, such as the network commonly referred to as the "Internet" shown at 29. Packet switched communications via the traffic network 21 and the Internet 29 may support a variety of user services through the network 10, such as mobile station communications of text and multimedia messages, email, web surfing or browsing, programming and media downloading, etc. For example, the mobile stations may be able to receive messages from and send messages to user terminal devices, such as personal computers, either directly (peer-to-peer) or via various servers (not separately shown). The drawing shows one such user terminal device as a personal computer (PC) at 31, by way of example. For purposes of discussing notifications, some notifications may entail an email message transmission of the notification to the subscriber's data terminal, such as to the PC 29 via the Internet 29.

Wireless carriers developed the short message service (SMS) to transmit text messages for display on the mobile stations. In many existing network architectures, the SMS traffic uses the signaling portion of the network 21 to carry message traffic between a Short Message Service Center (SMSC) 33 and the mobile stations. The SMSC supports mobile station to mobile station delivery of text messages. However, the SMSC also supports communication of messages between the mobile stations and devices coupled to other networks. For example, the SMSC 33 may receive incoming IP message packets from the Internet 29 for delivery via the network 21, one of the base stations 19 and a signaling channel over the air link to a destination mobile station. For this later type of SMS related communications, the network 10 also includes one or more Short Message Peer-to-Peer (SMPP) protocol gateways 34. The SMPP gateway provides protocol conversions, between SMPP as used by the SMSC 33 and the protocols used on the Internet 29 or other IP network. SMPP messages ride on IP transport, e.g. between the gateway 34 and the SMSC 33.

Of note for purposes of this discussion, many of the notifications discussed herein are sent to various mobile stations using SMS capabilities of the network 10. For example, when there is a change in or update to a subscriber's account, the network 10 will provide an appropriate notification using the customer communication system 41 in the form of an SMS message sent via the SMPP gateway 34, the SMSC 33, the traffic network 21, one of the base stations 19 and a signaling channel over the air link to the mobile station 13 of the subscriber/account holder.

The carrier will also operate a number of systems that provide ancillary functions in support of the communications services provided through the network 10, and those elements communicate with other nodes/elements of the network 10 via one or more private IP type packet data networks 35 (sometimes referred to as an Intranet). The support elements, for example, include one or more systems of record, such as the system shown at 39. An example of such a system 39 is a Vision system, which includes subscriber account records. A large carrier typically has a number of such systems, and the system that stores the account data for a particular subscriber may be referred to as the "system of record" for that subscriber's account.

The exemplary network 10 also includes a customer communications system 41, which is coupled for communication via the private network 35. The customer communications system 41 may have multiple servers or databases for the storage of information and files related to customer communication messages (not shown), and may provide the ability to access the customer communication system servers using a terminal device, such as a personal computer (not separately shown). The customer communications system 41 receives notification requests from various other carrier systems and generates and sends the requested notifications. The customer communications system 41 also generates an updated status report of the notification requests to allow for immediate review and confirmation of the successful processing of the notifications. In some cases, the system 41 also updates information in system(s) of record, as part of its processing in response to the notification requests.

The notification requests may be generated upon changes in a subscriber's account. For example, the customer communications system 41 may generate and send SMS messages, one to the mobile station 13 designated as that of the account holder, in response to a change in relevant account data or an updates in billing status. In the examples discussed in more detail below, the customer communications system 41 also supports alternative messaging, for example, in the form of facsimile, voice or email messages, and/or letter mailings which are used for account change notifications or the like, e.g. to provide notifications of significant account activities such as on-line access to add a number/station or to change the primary password on the account.

In practice today, the carrier will also offer its subscribers on-line access to a variety of functions related to the subscribers' accounts, such as review of billing statements and usage data, on-line payment, subscription changes, password control or the like. For that purpose, the carrier in our example operates a customer account web server 43, offering a 'MyAccount' (Now MyVerizon) type subscriber interface via the Internet. Hence, a user's terminal, such as PC 31, may be used to access on-line information about a subscriber's account, which the mobile carrier makes available via the carrier's MyAccount web site accessible through the Internet 29. Of note for purposes of the present discussions of notifications, the web site provides secure user access to enter and/or otherwise change various aspects of the subscriber's account related information. The website also may allow the subscriber to designate the MDN for the account holder's mobile station 13.

With that overview of the system, it may be helpful now to consider a high-level discussion of an example of an account change and notification, including how these services might appear from the user or subscriber's point of view. Assume now that the subscriber has an account with the carrier operating the mobile network and has access to account related functions/services through MyAccount or MyVerizon, via the Internet 29 and the server 43. The subscriber may use the PC 31 (or web enabled mobile station, etc.) to log-in via the site offered by the server 43 to change their account information. In operation, the subscriber would use their User ID and a password to log onto their own account page at the carrier's website, after which, the subscriber can then enter new data and/or revise existing account data via the account page. By way of an example, assume that the subscriber uses this technique to change the billing address on their mobile service account. As noted, the web site also allows the subscriber to select an MDN for the AH designation, but we will assume for discussion of further examples that the subscriber selects or has previously selected the MDN for the mobile station 13 as that of the account holder.

Upon completion of the subscription change, billing address in this example, the server 43 communicates with other network systems via the private network 35, for example, to store the new address information in one or more of the systems of record 39 and 53. For example, the server 43 sends a message through the network 35 to the Vision system 39 informing that system of the account change. The server 43 also sends a notification request file to the customer communications system 41, which will cause the system 41 to send one or more notifications. The customer communications system 41, not only processes the file, but as is discussed in more detail below, generates a report containing information regarding the location of notification file to allow for review of the notification file should any issues arise with its processing.

Figure 2:
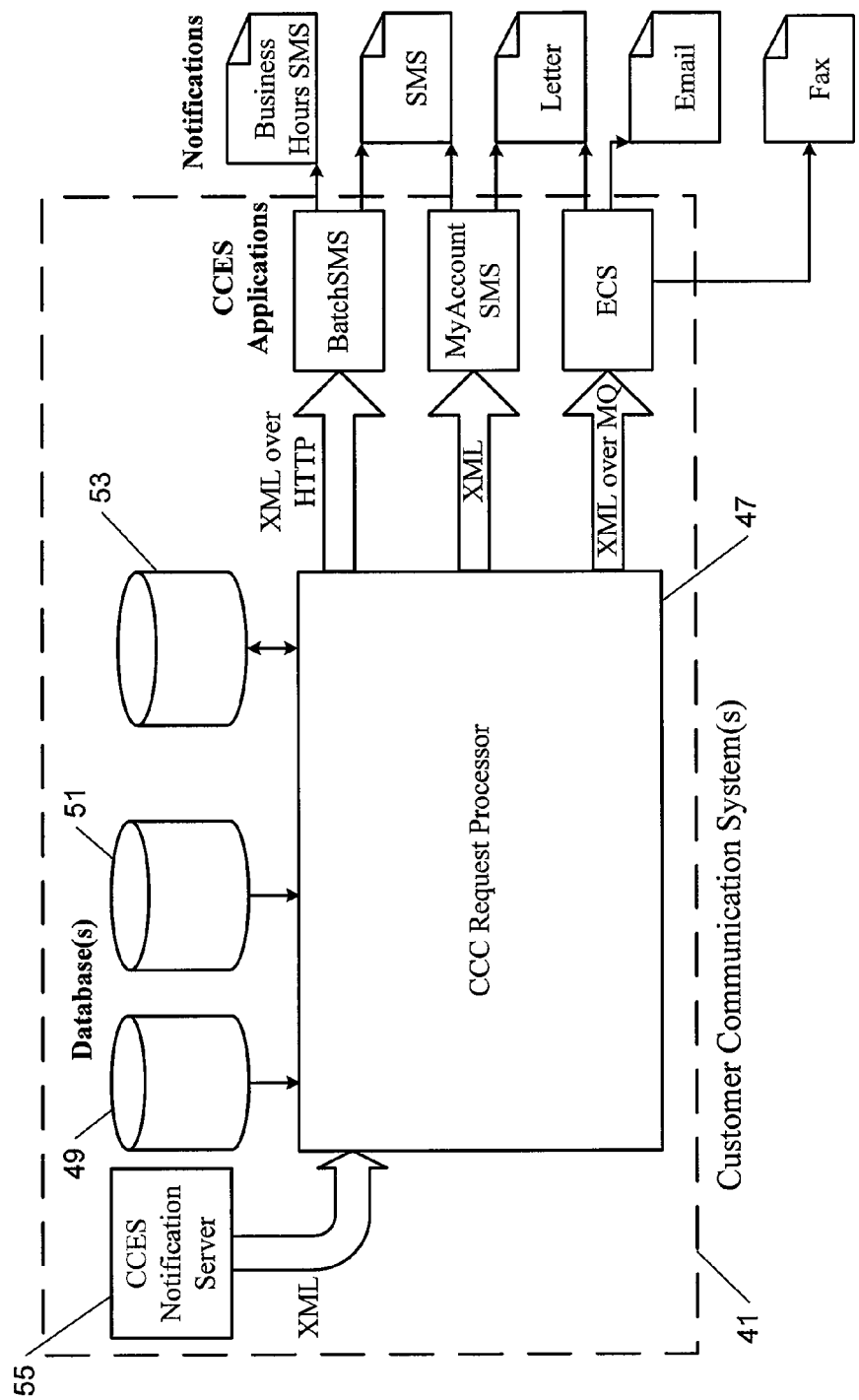
FIG. 2 is a functional block diagram useful in explaining an implementation of a customer communication system involved in providing reliable notifications to mobile subscribers.

FIG. 2 depicts software and associated functionalities, in block diagram form, where the software may be run on the hardware of a host or server type computer or system of such computers, to implement the customer communication system 41; and that drawing illustrates several other elements that communicate with that system for providing and monitoring notifications to mobile users. In the example, the customer communication system is implemented as an enterprise middleware web service written in Java that receives notification requests in the form of XML via HTTP or MQ In general, these communications utilize the CCES services to facilitate the sending of text message, Email, letter, and fax notifications. Hence, the customer communication system 41 may be implemented as middleware, that is to say, in this example, as software for implementing a CCC notification request processor 47 and a CCES Notification Server 55, as will be discussed in more detail below.

Although shown as a common platform at 41 in FIG. 1, the elements of the customer communication system 41 of FIG. 2 may be implemented on separate hardware communicating with each other via a network the same as or similar to network 35. For example, one or more of the databases 49, 51 and 53 typically will be implemented as separate servers in communications with the hardware platform(s) implementing the CCC notification request processor 47, although the databases may be implemented as records and appropriate application software running on the same computer as the middleware for the CCC notification request processor 47.

The CCC notification request processor 47 receives notification requests from the CCES Notification Server 55 and sends the desired notifications out via one or more delivery techniques. In the illustrated implementation, the CCC notification request processor 47 provides such notification services for a number of enterprise applications, particularly account change notifications. For example, enterprise applications such as MyVerizon running on the web server 43 may trigger notifications of certain activities on a subscriber's account, such as when a customer uses the on-line web service through server 43 to change their address, email address, MyAccount challenge question, MyAccount password, MyAccount secondary email addresses, or Vision password. In any such case, the CCES Notification Server 55 receives a file that will be processed by the CCC Request Processor 47 resulting in the CCC request processor 47 sending a customer notification.

The proposed example of the CCC notification request processor 47 receives notification requests in XML format from the CCES Notification Server 55. The system of FIG. 2 includes a TCP/IP socket based interface, in the form of a CCES notification server 55, to facilitate the notifications. The CCES Notification Server 55 appears as a server, and will act as a broker between the notification file generation and the CCES notification middleware, particularly the request processor 47. For example, the notification server 55 parses each message from the various notification file generators (not shown) to form an XML message appropriate for delivery to the CCC request processor 47. A regular expression based parser may be used to extract each field from the name value pairs contained in each of the notification request messages from the usage data aggregator platform. In the example, these fields are used to construct a CCC XML notification request following the CCC XML schema used as inputs to the CCC request processor 47.

As discussed later, with regard to FIGS. 3 and 4, if the CCES notification server 55 also maintains databases for storage and review of the notification files prior to sending the CCC notification request processor 47 for processing. Importantly, the CCES notification server 55 is able to generate a report regarding the location of all files maintained by the CCES notification server 55 prior to processing, which allows for immediate review should a problem arise. If any problems do arise, an e-mail alert may be generated to the CCES department requesting investigation prior to completion of the notification transmission to the subscriber. For example, if the CCC Request Processor 47 is programmed to expect a batch of files every hour for processing, and those files are not received, an e-mail alert may be generated requesting investigation as to the reason behind the CCES Notification Server 55 not transmitting those files to the CCC Request Processor 47. The e-mail alert would presumably be delivered to an agent associated with the CCES department. Using the generated report described below, the agent would be able to easily obtain information regarding the file, and to the extent needed, would be able to review any error correction information associated with that file type.

The customer communication system 41 will include or have communication access to a number of databases that store information used in performance of various notifications related functions. In the example, the customer communication system 41 includes a database 49 of business rules and a database 51 of notification message templates. The rules in the database 49 provide the logic for determining what notifications to send in response to the various account changes made. The template database 51 provides the format and common content, e.g. forms or templates, for the various notification messages sent out by the system 41.

The Preference Center is the database for communication preferences and account holder designation. Communications with this database 53 provide the CCC notification request processor 47 with information that is useful in processing of various notifications, including notifications regarding account. The database 53 and 41 communicate to store and retrieve the preference and account holder data needed to transmit a notification message.

Thus, the Preference Center directory 53 stores preference data regarding notifications for various network customer accounts that may be subject to notifications. The preference center directory 53, for example, stores the MDN of the account holder as designated by the subscriber. The directory may store other notification preference information for the subscriber account, for account change notifications and/or for other notifications that the carrier may want to provide to the subscriber, such as other notification destination addresses, etc. The language for the notification also may be specified by a field, e.g. as provisioned in the web server. The CCC request processor 47 communicates with the Preference Center application that updates its directory 53 using the Lightweight Directory Access Protocol (LDAP).

The customer communication system 41 also runs one or more message output applications, identified as CCES applications in FIG. 2, for processing the notification request messages output from the CCC notification request processor 47, as needed to generate and send the actual notification messages through one or more communication delivery channels. The CCC notification request processor 47 modifies notification request messages based on its processing and outputs the modified notification request messages in XML format to the appropriate one or more of the CCES applications, to send the actual notifications. The CCES applications comprise application programming software, which may run on the same or a different computer from the CCC notification request processor 47.

The CCES applications enable the customer communication system 41 to provide notifications, including notifications regarding account changes, and notifications for the other enterprise applications, using a number of communication techniques, as shown by way of example to the right of FIG. 2. Some messages may be batch processed for SMS communications or sent in individually in response to triggering events as represented by the MyAccount SMS processing in the drawing. Batch SMS communications may be limited to business hours if desired or sent at any time of the day. Event responsive notifications, such as those for the account change notifications, would be sent individually as the events are detected and processed through the customer communication system 41. The customer communication system 41 also supports other types of notifications, such as email, letter, or facsimile transmissions via an Enterprise Communication Services (ECS) function.

The customer communication system 41 could be implemented on a single hardware platform. However, to provide effective notification services for a large number of customers and a large volume of events requiring notification, including various account data changes, the customer communication system 41 may utilize a distributed system architecture. The exemplary system architecture will be highly available and fault tolerant. Those skilled in the art will recognize, however, that other system architectures may be used, e.g. to meet the demands of increased event and notification traffic account changes and/or other enterprise applications that require customer notifications.

The CCES software for notification services may be written in Java. Each CCES Notification Server node in the example has an instance of Websphere running the CCES notification software and the CCC/MyAccountSMS software on the same Java Virtual Machine (JVM). This allows the account change notifications to utilize all of the features of the customer communication system including: SMS notifications, EMS notifications, MMS notifications, Email notifications, fax notifications, letter notifications, notification templates, rules based failure notifications, preference center lookups, and weekly reports. EMS (Enhanced Messaging Service) is an application-level extension to Short Message Service (SMS) for cellular phones available on GSM, TDMA and CDMA networks. The CCC software, for example, makes the preference center lookups on the account number provided in the notification request to send SMS notifications to the Account Holder.

Figure 3:
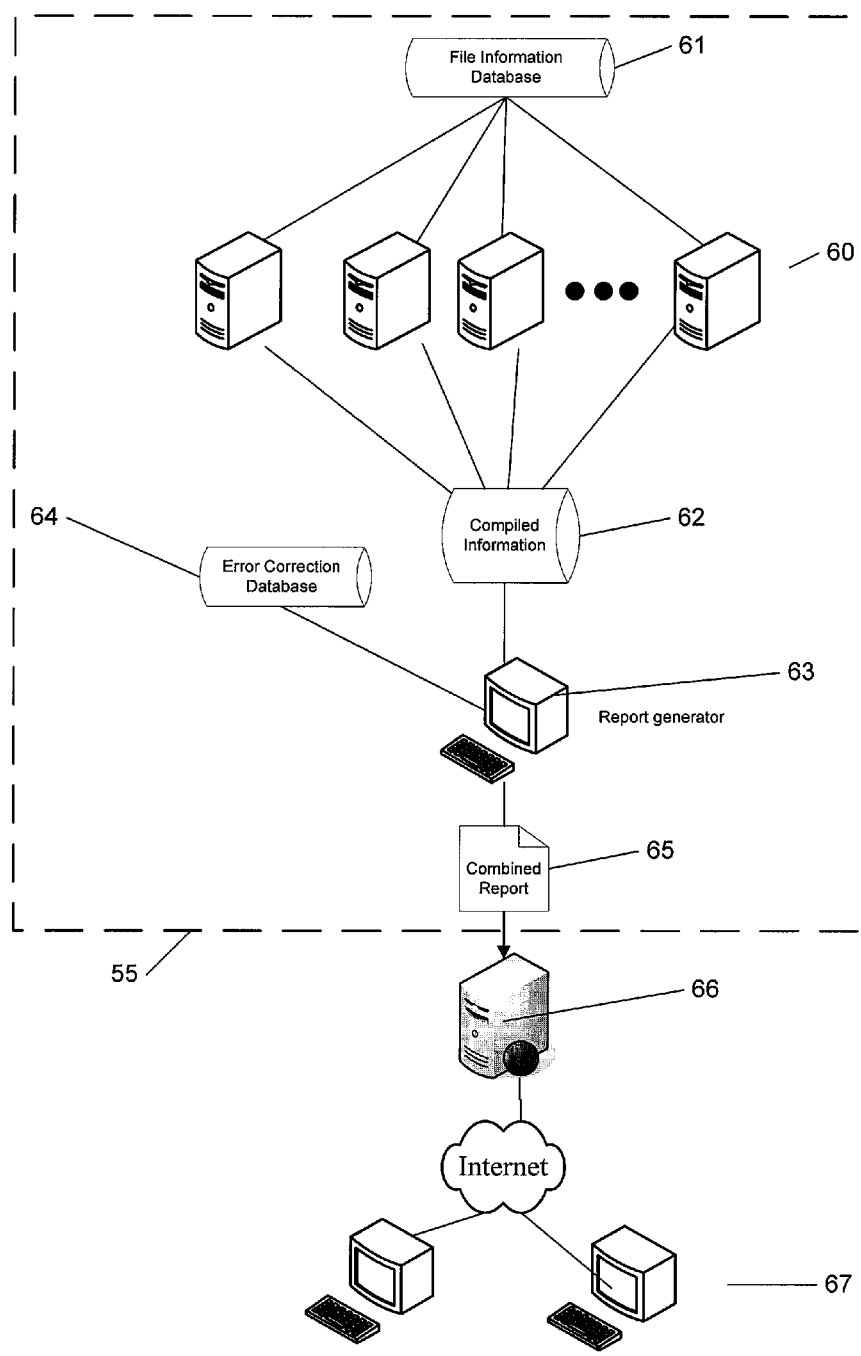
FIG. 3 is a network diagram of an example of hardware as may be used for generating a file status report within the customer communication system.

In the example of FIG. 3, an exemplary system architecture for the generation of a notification file report is shown. The exemplary system architecture will be highly available and fault tolerant. Those skilled in the art will recognize, however, that other system architectures may be used. FIG. 3 depicts the operation of the notification file report system operating on a plurality of servers and databases within the CCES notification server 55 of FIG. 2. To initiate the file reporting process, any one of a plurality servers 60 may initiate the search cycle as contemplated by the current invention. The servers 60 are designated to control the initiation of the search cycle at the expiration of a pre-programmed time duration. For example, the device may be programmed to reinitiate a new search cycle every hour which results in the creation of an updated file report discussed below.

A single server device 60 begins the cycle by accessing the file information database 61 located on any of the plurality of server devices 60. The file information database 61 contains specific information regarding the location of and the expected names of the critical customer communication files. The file information database may also contain the expected size, time of arrival, the business name of the process that creates the file, a brief description of the file, the time the file is scheduled to be processed, the name of the server the file is expected to be located on and the directory the file is expected to be located in. For example, if a single or batch of "Bill Ready" customer critical notifications are delivered to the CCES notification server 55 and are subsequently stored, prior to processing, on the servers 60 every business day at 10 a.m., the file information database 61 would provide the server device 60 operating the search with the expected location, file name, and size of the batch file associated with the repetitive delivery. Using the information received, the server device 60 begins searching the identified locations on the other servers 60 for the expected customer critical notification files. Following the initial search, the server device 60 proceeds to search for all other notification file types identified by the file information database 61, and records the results of each individual search in a compiled information database 62 located on any of the plurality of servers 60. If the batch of critical customer communications files is located in the expected location and with the expected file name, details regarding the file are recorded in the database 62. The details regarding the batch file may include the file name, the file size, the time the file was uploaded, the business name of the process that created the file, a brief description of the file, the time the file is scheduled to be processed, the name of the server the file resides on and the directory the file is located in. If the expected file is not located, the searched file name is recorded in the database 62, but is associated with a record size of zero.

Following the recordation of the customer critical file search results in the compiled information database 62, the scheduler and report generator machine 63 downloads the searched file information from the compiled information database 62. The report generator machine 63 preferably operates on one of the plurality of server devices 60 described above, but it may be a standalone machine (not shown). The report generator machine 63 reviews the results of the file searches stored in the compiled information database 62. If the report generator detects a missing file or a file with no data, the report generator machine 63 accesses an error correction database 64 to obtain information regarding the errors. The error correction database 64 may provide the report generator machine 63 with administrator contact information, the business name of the process that created the file and a brief description of the file, contact information associated with the creation of the file to allow a person reviewing the report to easily correct the error associated with the identified file. Following the collection of the error correction information from the error correction database 64, the report generator machine 63 generates a compiled report 65.

The compiled report 65 contains the information from the compiled information database 62, in combination with the error correction information obtained from the error correction database 64. In its simplest form, the compiled report 65 would allow a reviewer of the compiled report 65 to quickly locate the current status of customer critical notification file, and if an error is present, easily review the required corrective measures without accessing another database or searching somewhere else for instructions on how to fix any errors.

To allow for the compiled report 65 to be utilized by multiple users, the compiled report 65 may be published to a web server 66. The web server 66 may be any computer or server that delivers the compiled report via the HTTP protocol. The web server 66 may include hardware, operating system, Web server software, TCP/IP protocols and site content. In another example, the web server 66 may be limited such that it is only available internally within the Verizon Wireless network, and would be commonly referred to as an "intranet server". Publishing the compiled report 65 on the web server 66 allows any number of users (represented as an example by the computer terminals 67) to immediately access the most recent version of the compiled report 65 generated by the report generator machine 63. The web server 66 may be a unique machine, or may operate in combination with the existing customer account web server 43.

Figure 4:
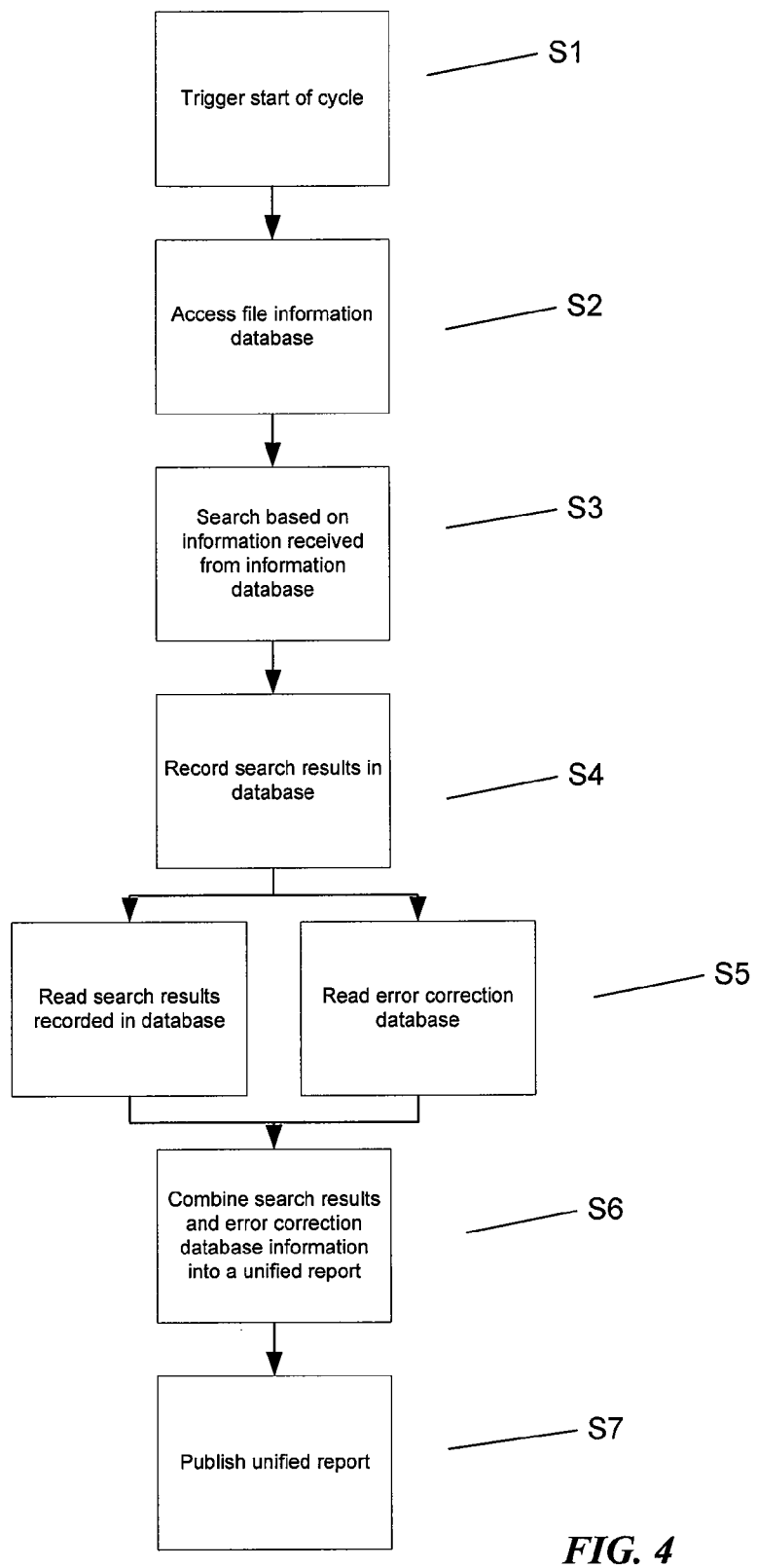
FIG. 4 is a high-level flow chart illustrating a process for generating a file status report within the customer communication system.

The flow chart of FIG. 4 provides a high level illustration of the centralized reporting system and compiled report creation. As shown in FIG. 4, the file transfer status collection is a repetitive process that restarts at the end of each set time cycle. In our example, this cycle will restart every one hour. At step S1, in the process of FIG. 4, within the plurality of servers 60 within the CCES notification server 55 of FIG. 2, a centralized reporting system initiates the file transfer status collection cycle. At step S2, the centralized reporting system accesses the file information database 61 to obtain file information as described above.

At step S3, a search is conducted by one file server 60 of the other remaining file servers 60 within the CCES 55 to locate customer critical notification files associated with the file information received from the file information database 61 in step S2.

In step S4, any files identified in step S3 and the expected location of any missing files are recorded in a file database 62.

In step S5, a report generator machine 63 reads the file types recorded in the file database 62 in step S4, and reads static documentation stored in documentation database table 64 containing information on the proper steps for correction of any errors by the CCES department.

In step S6, the report generator machine 63 produces a combined report 65 combining a listing of the file search results with instructions on repairing or locating any damaged files.

In step S7, the combined report 65 is published to a web server 66 so that the combined report 65 may be accessed by any number of personnel 67 in order to easily locate the incorrect file in response to an email received by the CCES department.

As shown by the above discussion, functions relating to the monitoring of the locations of customer-critical files, the identification of missing customer-critical notification files or other errors, and the attendant notice reporting/publication may be implemented on computers connected for data communication via the components of various networks, configured to provide mobile communication services and related service features, as shown in FIGS. 1 and 2. Although special purpose devices may be used, such devices also may be implemented using one or more hardware platforms intended to represent a general class of data processing device commonly used to run "server" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the various databases 61, 62 and 64. The software code is executable by the general-purpose computer that functions as the centralized reporting system and/or the customer communications system. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for the monitoring of customer-critical files, the identification of file errors and the related reporting, in essentially the manner performed in the implementations discussed and illustrated herein.

Figures 5, 6:
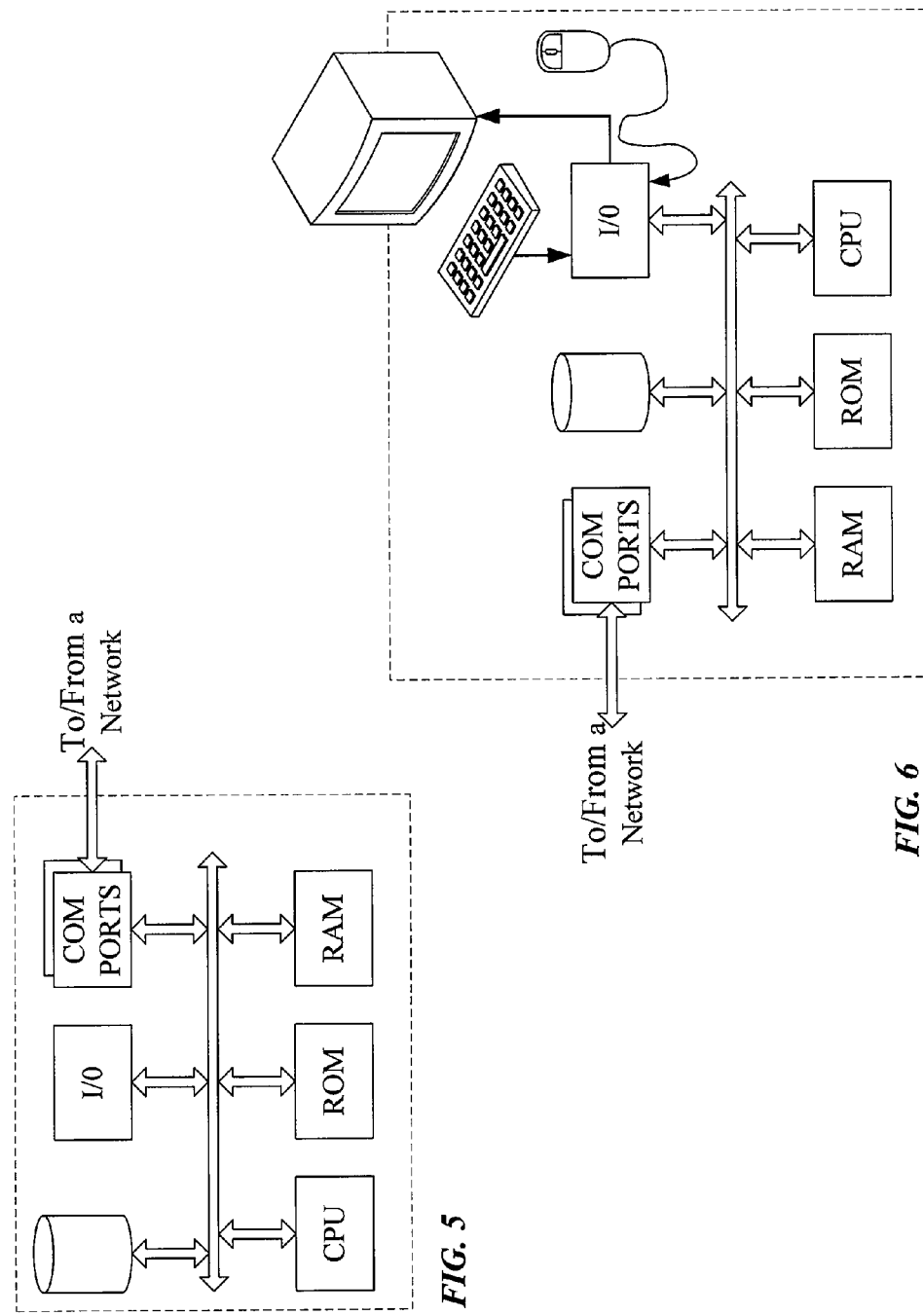
FIG. 5 is a simplified functional block diagram of a computer that may be configured as a host or server.
FIG. 6 is a simplified block diagram of a personal computer or other work station or terminal device.

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of the monitoring and reporting on customer-critical files and the identification of missing customer-critical notification files outlined above may be embodied in programming. Program aspects of the technology may be thought of as "products" or "articles of manufacture" typically in the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another, for example, from a management server or host computer of the network operator into the computer platform(s) that serve as the customer communication system 41. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the monitoring and reporting on customer-critical files, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

AH—Account Holder
BS—Base Station
BTS—Base Transceiver System
CD—Compact Disk
CDMA—Code Division Multiple Access CD-ROM—Compact Disk-Read Only Memory
CCC—Centralized Customer Communications
CCES—Customer Care Enterprise Services
CCS—Customer Communications System
CPNI—Customer Proprietary Network Information
CPU—Central Processing Unit
CSS—Content Services Switch
DVD—Digital Video Disk
DVD-ROM—Digital Video Disk-Read Only Memory
ECS—Enterprise Communication Services
EMS—Enhanced Messaging Service
EEPROM—Electrically Erasable Programmable Read Only Memory
EPROM—Erasable Programmable Read Only Memory
FCC—Federal Communications Commission
GSM—Global System for Mobile communications
HTTP—Hypertext Transfer Protocol
ID—Identifier
IP—Internet Protocol
IR—InfraRed
IVR—Interactive Voice Response
JVM—Java Virtual Machine
LDAP—Lightweight Directory Access Protocol
MDN—Mobile Director Number
MIN—Mobile Identification Number
MMS—Multimedia Message Service
MQ—Message Queuing
MS—Mobile Station
MTN—Mobile Telephone Number
NDM—Network Data Mover
PC—Personal Computer
PROM—Programmable Read Only Memory
PSTN—Public Switched Telephone Network
RAM—Random Access Memory
RAN—Radio Access Network
RF—Radio Frequency
ROM—Read Only Memory
SMPP—Short Message Peer-to-Peer
SMS—Short Message Service
SMSC—Short Message Service Center
TCP—Transmission Control Protocol
TCP/IP—Transmission Control Protocol/Internet Protocol
TDMA—Time Division Multiple Access
VZW—VeriZon Wireless
WAN—Wide Area Network
XML—eXtensible Markup Language

What is claimed is:

1. A method of generating a report concerning the location of a customer notification file within the customer communication system, comprising steps of:
   accessing a file information database to obtain at least one of a directory location or a file name template of a file following a file transfer of the file to the customer communication system;
   searching at least one server device for the presence of the file using the at least one of a directory location or a file name template obtained from the file information database;
   compiling information received in response to searching for the presence of the file;
   accessing an error correction database, storing error correction reference instructions for instructing users on how to correct file transfer errors, to obtain error correction reference instructions on how to correct a possible file transfer error associated with the file transfer of the file;
   associating the error correction reference instructions with the file;
   generating a report containing information regarding the file and the associated error correction reference instructions obtained from the error correction database for reference by a user during a review of the report; and
   allowing a user to access the report.

2. The method of claim 1, further comprising sending an alert to the user prompting the user to review the report.

3. The method of claim 2, wherein the alert is sent via email.

4. The method of claim 1, wherein the user accesses the report using a web browser.

5. The method of claim 1, wherein the file information database is modifiable to allow for new file types to be added to the file information database.

6. The method of claim 1, wherein the report includes at least one of the file name, the error correction instructions, a subject server name, a file directory, file content or file transfer records associated with the expected file.

7. The method of claim 1, wherein the searching of at least one server device is controlled by a master scheduler that automatically initiates the searching of at least one server.

8. The method of claim 7, wherein the report is generated at least every hour to allow access to an updated compiled report.

9. A mobile communications system comprising:
   a traffic network configured to support mobile wireless communications for mobile stations of network subscribers;
   a plurality of servers in communication with the traffic network, storing files of recorded information regarding mobile stations and/or network subscribers;
   an error correction database storing error correction reference instructions for instructing users on how to correct file transfer errors; and
   one or more mobile communications network elements comprising a processor in communication with the servers, the processor configured to:
      access a file information database to obtain at least one of a directory location or a file name template of a file following a file transfer of the file to the customer communication system;
      search at least one server device for the presence of the file using the at least one of a directory location or a file name template obtained from the file information database;
      compile information received in response to searching for the presence of the file;
      access the error correction database to obtain error correction reference instructions on how to correct a file transfer error associated with the file transfer of the file;
      associate the error correction reference instructions with the file;
      generate a report containing information regarding the file and the associated error correction reference instructions obtained from the error correction database for reference by a user during a review of the report; and
      allow a user to access the report.

10. The system of claim 9, wherein the mobile communications system further comprises the file information database and the file information database is modifiable to allow for new file types to be added to the file information database.

11. An article of manufacture, comprising:

a non-transitory machine readable storage medium; and, executable program instructions embodied in the non-transitory machine readable storage medium for execution by at least one computer, wherein execution of the program instructions causes said at least one computer to perform functions comprising:

accessing a file information database to obtain at least one of a directory location or a file name template of a file following a file transfer to the customer communication system;

searching at least one server device for the presence of the file using the at least one of a directory location or a file name template obtained from the file information database;

compiling information received in response to searching for the presence of the file;

accessing an error correction database, storing error correction reference instructions for instructing users on how to correct file transfer errors, to obtain error correction reference instructions on how to correct a file transfer error associated with the file transfer of the file;

associating the error correction reference instructions with the file generating a report containing information regarding the file and the associated error correction reference instructions obtained from the error correction database for reference by a user during a review of the report; and, allowing a user to access the report.

12. The article of claim 11, wherein execution of the program instructions causes said at least one computer to perform functions further comprising sending an alert to the user prompting the user to review the published compiled report.

13. The article of claim 12, wherein the alert is sent via email.

14. The article of claim 11, wherein execution of the program instructions causes said at least one computer to make the published report accessible to the user using a web browser.

15. The article of claim 11, wherein execution of the program instructions causes said at least one computer to make the file information database modifiable to allow for new file types to be added to the file information database.

16. The article of claim 11, wherein the compiled report includes at least one of a subject server name, file directory, file content or file transfer records associated with the file.

17. The article of claim 11, wherein execution of the program instructions causes said at least one computer to implement a master scheduler, and to perform the searching of at least one server device under control by the master scheduler to automatically initiate the searching of at least one server.

18. The article of claim 17, wherein execution of the program instructions by said at least one computer causes the master scheduler to initiate generation of the compiled report at least every hour to allow access to an updated compiled report.

19. The method of claim 1, wherein the steps are performed automatically.

* * * * *